US008201213B2

(12) United States Patent
Young et al.

(10) Patent No.: US 8,201,213 B2
(45) Date of Patent: Jun. 12, 2012

(54) CONTROLLING ACCESS OF APPLICATION PROGRAMS TO AN ADAPTIVE INPUT DEVICE

(75) Inventors: Robert D. Young, Kirkland, WA (US); Daniel M. Sangster, Bellevue, WA (US); Marc DesCamp, Seattle, WA (US); Scott M. Mail, Seattle, WA (US); Vincent Ball, Kirkland, WA (US); Dennis Meinhardt, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 12/427,882

(22) Filed: Apr. 22, 2009

(65) Prior Publication Data

US 2010/0275218 A1 Oct. 28, 2010

(51) Int. Cl.
*G06F 21/00* (2006.01)
(52) U.S. Cl. .................. 726/1; 726/16; 719/320
(58) Field of Classification Search .................. None
See application file for complete search history.

(56) References Cited

U.S. PATENT DOCUMENTS

| | | | | | |
|---|---|---|---|---|---|
| 4,200,913 | A | * | 4/1980 | Kuhar et al. | 341/23 |
| 4,290,121 | A | * | 9/1981 | Boone et al. | 365/189.07 |
| 5,818,361 | A | | 10/1998 | Acevedo | |
| 6,014,131 | A | * | 1/2000 | Barry et al. | 345/172 |
| 6,625,603 | B1 | * | 9/2003 | Garg et al. | 707/758 |
| 6,664,982 | B1 | * | 12/2003 | Bi | 715/773 |
| 7,096,430 | B2 | * | 8/2006 | Owhadi | 715/765 |
| 7,926,086 | B1 | * | 4/2011 | Violleau et al. | 726/1 |
| 7,978,618 | B2 | * | 7/2011 | Richardson et al. | 370/252 |
| 2003/0046401 | A1 | * | 3/2003 | Abbott et al. | 709/228 |
| 2003/0048306 | A1 | * | 3/2003 | Owhadi | 345/781 |
| 2004/0267746 | A1 | * | 12/2004 | Marcjan et al. | 707/8 |
| 2005/0183035 | A1 | * | 8/2005 | Ringel et al. | 715/811 |
| 2005/0262549 | A1 | * | 11/2005 | Ritt et al. | 726/1 |
| 2006/0284846 | A1 | * | 12/2006 | Pate et al. | 345/168 |
| 2007/0091010 | A1 | * | 4/2007 | Richardson et al. | 345/2.1 |
| 2009/0013309 | A1 | * | 1/2009 | Shavlik | 717/120 |
| 2009/0094561 | A1 | * | 4/2009 | Do et al. | 715/863 |
| 2009/0251417 | A1 | * | 10/2009 | Pate et al. | 345/168 |
| 2010/0083109 | A1 | * | 4/2010 | Tse et al. | 715/702 |

* cited by examiner

*Primary Examiner* — Oscar Louie
(74) *Attorney, Agent, or Firm* — Alleman Hall McCoy Russell & Tuttle LLP (57) ABSTRACT

Methods and systems for controlling access of application programs to an adaptive input device are described herein. One exemplary computing system includes an application programming interface executable on a computing device for controlling said access to an adaptive input device having a plurality of display regions. The application programming interface is configured to receive a display request from one of the application programs to display formatted output on the composite display and is further configured to apply at least a display sharing policy based on application-specific policy settings received from the application program for defining an application-specific area including at least one of the display regions. Further, the application programming interface is configured to generate formatted output based on the application-specific policy settings, and to send the formatted output to the application-specific area for display. The application-specific policy settings include a shared display mode and an exclusive display mode.

19 Claims, 4 Drawing Sheets

FIG. 1

CONTROLLING ACCESS OF APPLICATION PROGRAMS TO AN ADAPTIVE INPUT DEVICE

BACKGROUND

It has been a continuing challenge to develop a computer keyboard that has display functionality. One particular difficulty is that two or more application programs may desire access to display output to the keyboard at the same time. No convenient mechanism exists to resolve conflicts between display requests from differing applications. Further, there may be confusion in routing input from the keyboard to these different application programs, as well as routing output from the application programs to display output on the keyboard. As a result, development of application programs for such keyboards has not advanced significantly to date.

SUMMARY

Methods and systems for controlling access of application programs to a composite display of an adaptive input device are described herein. One exemplary computing system includes an application programming interface executable on a computing device for controlling said access to an adaptive input device having a plurality of display regions. The application programming interface is configured to receive a display request from one of the application programs to display formatted output on the composite display and is further configured to apply at least a display sharing policy based on application-specific policy settings received from the application program for defining an application-specific area including at least one of the display regions. Further, the application programming interface is configured to generate formatted output based on the application-specific policy settings, and to send the formatted output to the application-specific area for display. The application-specific policy settings include a shared display mode and an exclusive display mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
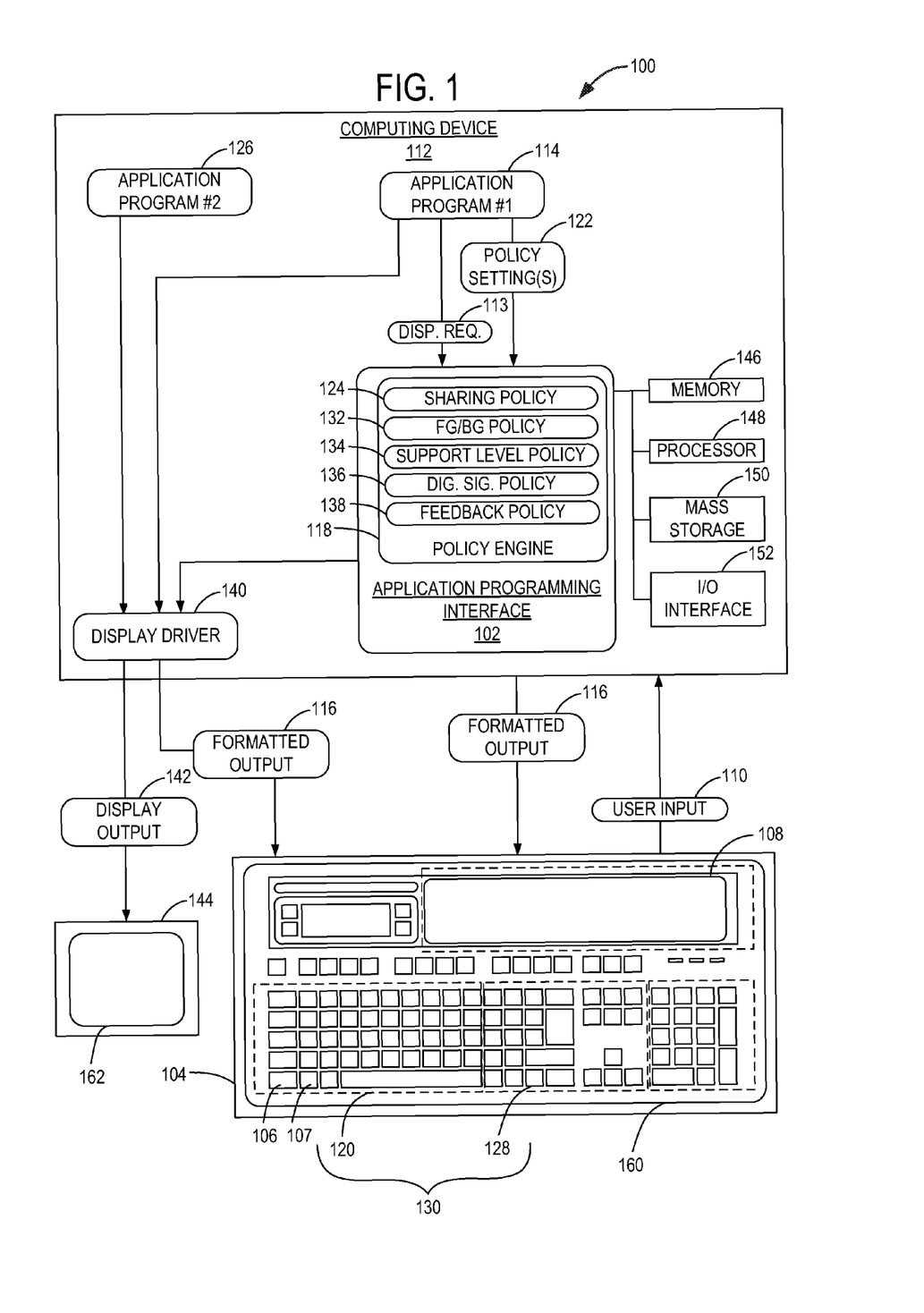
FIG. 1 is a schematic view of an embodiment of a computing system for controlling access of application programs to an adaptive keyboard device.

FIG. 1 illustrates a schematic view of a computing system 100 including an application programming interface 102 for an adaptive input device, such as an adaptive keyboard device 104. The adaptive keyboard device 104 may be formed by a plurality of display regions and/or keys (e.g., key 106, key 107), where some or all of the keys may be mechanically depressible. Some of the display regions may be formed on a surface of the plurality of spatially fragmented keys. In another embodiment, display regions may be touch-sensitive display regions (e.g., touch-sensitive display region 108) and thus configured to receive touch input. The computing system 100 may control access of a plurality of application programs to the composite display of the adaptive keyboard device 104.

Graphics can be displayed on the adaptive keyboard device 104, said graphics being projected by a projector to one or more display regions. As discussed above, display regions may be on a surface of one or more keys, where display regions (e.g., surfaces) of the plurality of keys can be logically contiguous to thereby display a logically continuous graphic across a plurality of spatially fragmented keys. One potential advantage of an adaptive keyboard device configured to display graphics over display regions that are spatially fragmented (e.g., display regions on the surfaces of keys) includes an increased flexibility and magnitude of areas available for display.

The adaptive keyboard device 104 can also include touch-sensitive display regions (e.g., touch-sensitive display region 108) that are spatially fragmented yet not formed on the surface of keys.

The adaptive keyboard device 104 may be configured to recognize user input 110 by mechanical depression, or actuation, of one or more keys. In another embodiment, the adaptive keyboard device 104 may include a sensor to detect touch input 110 from a user over one or more touch-sensitive display regions. The sensor may detect a user presence, a pressure or electrical change from a touch by a user, and/or a movement of the keyboard using an accelerometer, as some examples.

In one example, several application programs may be operable on a computing device with one or more peripheral adaptive input devices operatively connected to the computing device. Some or all of the application programs may desire access to the one or more adaptive input devices in order to display various graphics and in order to receive user input relevant to the respective applications. In order to control access to an adaptive keyboard device 104, for example, the computing system 100 includes an application programming interface 102 executable on the computing device 112.

In one embodiment, the application programming interface 102 may control access of the plurality of application programs to an adaptive input device desktop 160 displayed on the composite display of the adaptive input device 104. The adaptive input device desktop 160 may be independent of an active desktop 162 of the computing system 100, where the active desktop 162 may be displayed on display 144. That is, the adaptive input device desktop 160 and the active desktop 162 may be controlled independently such that different graphical images may appear concurrently on both the adaptive input device desktop 160 and the active desktop 162.

The application programming interface 102 may be configured to receive a display request 113 from one of the application programs (e.g., first application program 114, second application program 126) to display formatted output 116 on the composite display. In order to define an application-specific area of the composite display for interoperation with each application program, the application programming interface 102 may include a policy engine 118 for applying a plurality of policies in order to define an application-specific area, such as first application-specific area 120. Policies may be based on application-specific policy settings 122 received from the application programs and will be discussed in detail below.

Application-specific areas are indicated in FIG. 1 by areas enclosed in dashed-line boxes of the adaptive keyboard device 104, and may include one or more keys, non-key touch-sensitive display regions, etc., to collectively form a composite display.

In one example, the application programming interface 102 may apply a display sharing policy 124, for defining an application-specific area 120, such as first application-specific area 120 including at least one of the keys (e.g., key 106, key 107). For example, the application-specific policy settings 122 regarding the display sharing policy 124 may include a shared display mode and/or a exclusive display mode for the first application program 114.

The shared display mode may indicate that the first application program 114 is assigned to interoperate with a first application-specific area 120 including a subset of an assignable region of the composite display. An example of application programs running in the shared display mode include a first application program 114 being allowed access to a first application-specific area 120 of the adaptive keyboard device 104 while a second application program 126 (or any other suitable number of application programs) is concurrently being allowed access to a second application-specific area 128 for the second application program 126.

In contrast, the exclusive display mode indicates that an application program is assigned to interoperate with an application-specific area including substantially all of the composite display of the adaptive keyboard device 104. In one example of operation of an application program in the exclusive display mode, a first application program 114 is assigned exclusive access to the entirety of the composite display, and all other running applications (e.g., second application program 126) may be hidden, minimized, and/or shut down. In some examples, the entirety of the composite display may include an assignable region of the composite display that is substantially all of the adaptive keyboard device 104. In other examples, the entirety of the composite display may include less than all of the adaptive keyboard device 104 (e.g., third application-specific area 130), depending on features of the adaptive keyboard device 104 as well as parameters of an application program operating in the exclusive display mode.

Independent of whether an application program is to be operated in a shared display mode or the exclusive display mode, an application program such as first application program 114 may interoperate with an application-specific area by receiving user input via actuation, or mechanical depression, of the keys (e.g., key 106, key 107) and outputting formatted output 116 for display on a display region on the surface of a key in the application-specific area. In another example, an application program may interoperate with an application-specific area by receiving user input via touch input at touch-sensitive display regions (e.g., touch-sensitive display region 108) of the application-specific area (e.g., first application-specific area 120) and by outputting formatted output 116 for display on a touch-sensitive display region of the application-specific area.

It may be appreciated that any number of application programs may be allowed concurrent access to respective application-specific areas when the application programs have respective sharing display policies specifying the shared display mode. Furthermore, an application program may be assigned more than one application-specific area, and an application-specific area may include one or more sub-regions. Positions and/or positioning of application-specific areas and/or sub-regions of the application-specific areas of the composite display may be customizable (e.g., movable by touch input and dragging) by a user to form a customized composite display layout.

The display sharing policy 124 as described is one policy that may be applied to define the application-specific area. Other policies that may be applied for various reasons include a focus-based foreground-background policy 132, an adaptive support level policy 134, a digital signature policy 136 and/or a feedback policy 138, discussed in detail below.

The application programming interface 102 may apply a focus-based foreground-background policy 132 based on application-specific foreground-background policy settings received from first application program 114 in the application-specific policy settings 122. By applying the focus-based foreground-background policy 132, a foreground display mode or a background display mode for the formatted output 116 of an application program may be defined.

For some application programs, it may be appropriate to show graphics on the respective application-specific area of the adaptive keyboard device 104 when the first application program 114 has user focus. One example includes a word processing application program, where it is appropriate to show formatting options in a respective application-specific area when the word processing application program has user focus, and where showing said formatting options when the word processing application program does not have focus may not be desirable. In such a case, the application programming interface 102 may receive a background display mode policy setting from the first application program 114 in the application-specific policy settings 122, and said setting may be appropriately stored in the focus-based foreground-background policy 132.

On the other hand, it may be appropriate for another application program, such as second application program 126 (e.g., a media player) to visibly show graphics (e.g., a volume control) on respective application-specific area(s) of the adaptive keyboard device 104 regardless of whether the application program has user focus. In this case, the application programming interface 102 may receive application-specific policy settings 122 including a foreground display mode policy setting from the media player application program, and this may be appropriately stored in the focus-based foreground-background policy 132.

The application programming interface 102 may also be configured to apply an adaptive support level policy 134 based on application-specific adaptive support level policy settings received from the first application program 114 in the application-specific policy settings 122. By applying the adaptive support level policy 134, a display priority level for the formatted output 116 of the first application program 114 may be specified.

There may be several levels of display priority level associated with capabilities of an application program or a preferred method of interoperation of an application program with an adaptive keyboard device. A first level may be a FULL level, in which an application program is appropriately operated in the exclusive display mode described above such that it may interoperate with an entirety of an assignable region of the adaptive keyboard device. A second level may be a PARTLY level, in which an application program is appropriately operated in the shared display mode described above, such that the application program is assigned less than an entirety of an assignable region of the adaptive keyboard device, when the adaptive keyboard device is divided.

A third level may be a MINIMAL level, indicating that an application program can be operated independent of some display regions of the composite display of the adaptive keyboard display. For example, an application program may interoperate with display regions on the surface of keys but may not interoperate with other display regions of the composite display. Further, a fourth level may be a NONE level, in which an application program is configured to only receive user input via the mechanically depressible function of the keys, and may receive other standard support, such as multi-language QWERTY keyboard support and modifier key support, as some examples.

It may be appreciated that a display priority level policy setting for an application program may be a recommendation and/or a rule. Further, the display priority level for an application program may be used in the defining of the adaptive support level policy 134. In another example, the display priority level may be combined with the focus-based foreground-background policy 132 to define behavior of an application program with respect to its interoperation with the adaptive keyboard device 104.

Referring now to digital signature policy 136, the application programming interface 102 may apply the digital signature policy 136 to thereby specify an availability of a user-defined override and an availability of an application program-defined override. In this example, the digital signature policy 136 is based on digital signature policy settings received from the first application program 114 in the application-specific policy settings 122, where the digital signature policy settings may include a user-defined override to override a disablement of the application program. If a user-defined override is available, a user is provided the option to manually override a disablement of an application program that lacks a valid digital signature. If a user-defined override is not available, a user is unable to manually override a disablement of an application program without a valid digital signature.

Similarly, the digital signature policy setting received at the application programming interface 102 in the application-specific policy settings 122 may include an application program-defined override specifying that, if available, the application program is able to override a digital signature check, and thus a disablement of the application program. On the other hand, if the application-defined override is not available, the application program will be unable to override a digital signature check. This will be described in more detail with respect to FIG. 4.

Further still, the application programming interface 102 may be configured to apply a feedback policy 138 based on feedback policy settings received from the first application program 114 in the application-specific policy settings 122. The feedback policy 138 may specify an availability of an operation recommendation message from the first application program 114 and/or from an adaptive device developer. As one example, an operation recommendation message may include a displayable message indicating a preferred mode of operation (e.g., "run this application in FULL mode"). Further, user rankings and user comments regarding experiences with the first application program 114 in conjunction with the adaptive keyboard device 104 may be available on website forums, and/or in community ranking engines at a device developer server. As such, the feedback policy 138 may also specify an availability of user experience rankings from a community ranking engine for the formatted output 116, such that user experience rankings can be made available to a user of the first application program 114 upon installation or use of the first application program 114. That is, the user experience rankings may be automatically or semi-automatically accessed by the first application program 114 or the device developer for display in order to provide a user with recommendations and/or information with which the user may then decide in which mode to run, or whether or not to run, the first application program 114.

The application programming interface 102 may be further configured to generate formatted output 116 based on the application-specific policy settings 122 (e.g., shared display mode, foreground display mode, etc). The application programming interface 102 may send the formatted output 116 to an application-specific area (e.g., first application-specific area 120, second application-specific area 128, third application-specific area 130) of the adaptive keyboard device 104, via a display driver 140, for display. Additionally, display output 142 may be sent from a number of application programs (e.g., first application program 114, second application program 126) to one or more additional displays, such as display 144, via the display driver 140 for display on the active desktop 162.

The application programming interface 102 may be stored on mass storage 150 and executed by processor 148 using portions of memory 146, and may further be configured to communicate via an input/output interface 152 to achieve the functionality disclosed herein.

By the description of a computing system above, it can be appreciated that the adaptive input device of the computing system may be a handheld computing device without mechanically depressible keys. That is, an adaptive input device may include only touch-sensitive display regions configured to receive touch input.

Figure 2:
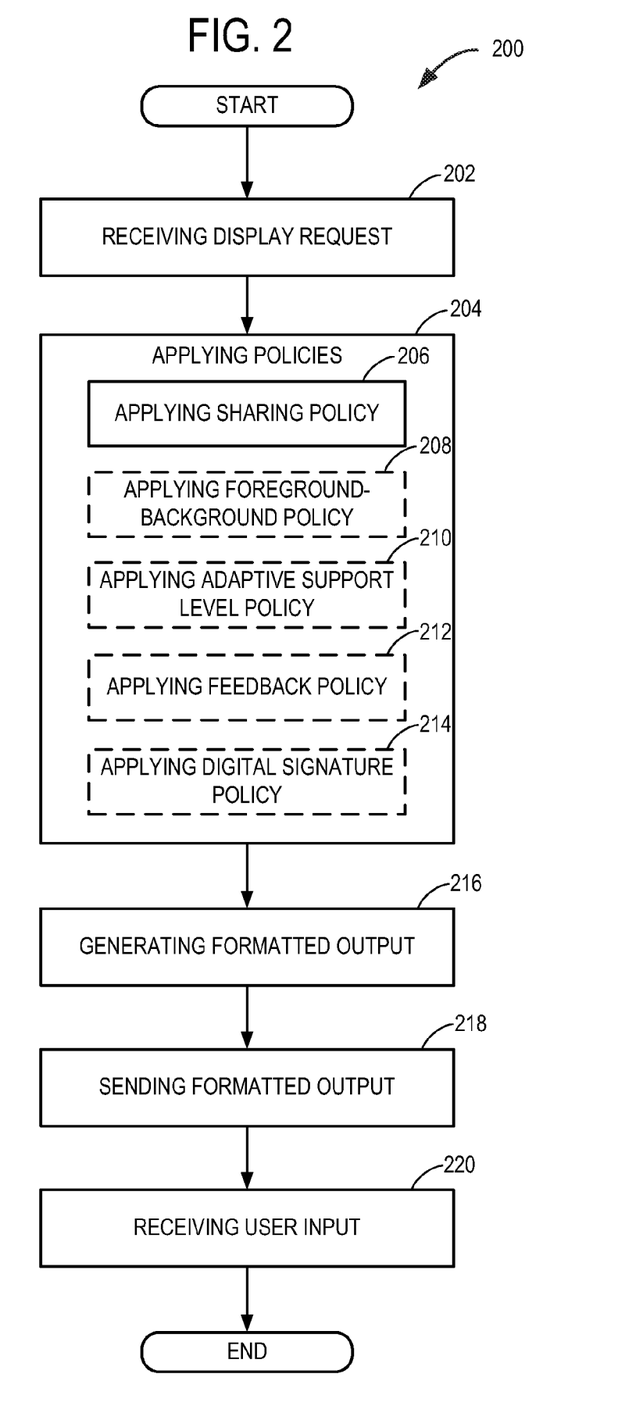
FIG. 2 is a flowchart illustrating an embodiment of a method for controlling access of application programs to an adaptive input device.

Referring now to FIG. 2, a flowchart illustrates a method 200 for controlling access of a plurality of application programs to a composite display of an adaptive input device. At 202, the method may include receiving a display request from one of the application programs at an application programming interface to display formatted output on the composite display.

At 204, the method may include applying policies, for example at a policy engine. The method includes at least applying a display sharing policy at 206, which is based on application-specific policy settings received from an application program, in order to determine an application-specific area including at least one of the display regions of an adaptive input device. Similar to that discussed above with respect to FIG. 1, the application-specific policy settings for the display sharing policy described with respect to the method 200 includes a shared display mode and a exclusive display mode for each application program. The shared display mode indicates that an application program is assigned to interoperate with an application-specific area including a subset of an assignable region of a composite display, and the exclusive display mode indicates the application program is assigned to interoperate with an application-specific area including substantially all of an assignable region of a composite display. The interoperating may include receiving user input via actuation of a mechanically depressible key having a display region on its surface and/or receiving touch input at a touch-sensitive display region.

It may be appreciated that the application programming interface is configured to receive touch input via an adaptive input device, such that application-specific areas or sub-regions of application-specific areas of the composite display may be movable by touch input or other peripheral device input (e.g., cursor input via a computer mouse), to thereby form a customizable composite display layout.

As described above, any or all of policies contained in a policy engine may be applied to further characterize the application-specific area and/or formatted output for display.

Application of the one or more policies may be executed at a policy engine configured to apply a plurality of policies based on application-specific policy settings received from the application program, for the generating of the formatted output.

For example, the method 200 may include applying a focus-based foreground-background policy at 208 based on foreground-background policy settings received from an application program, to thereby specify a foreground display mode or a background display mode for formatted output of an application program. Further, the method 200 may include applying an adaptive support level policy at 210 based on adaptive support level policy settings received from the application program to thereby specify a display priority level for the formatted output of the application program. Further still, the method 200 may include applying a feedback policy at 212 based on feedback policy settings received from the application program, to thereby specify availability of an operation recommendation message from the application program and/or from an adaptive device developer for the formatted output. Applying a feedback policy may also specify availability of user experience rankings from a community ranking engine for the formatted output. At 214, the method may include applying a digital signature policy based on digital signature policy settings received from the application program to thereby specify an availability of a user-defined override and an availability of an application program-defined override.

The method also includes generating formatted output based on application-specific policy settings at 216 and sending the formatted output to one or more of the display regions of the application-specific area for display at 218.

The method 200 may also include receiving user input at 220 from the adaptive input device via actuation of a mechanically depressible key and/or via touch input over a touch-sensitive display region.

Figure 3:
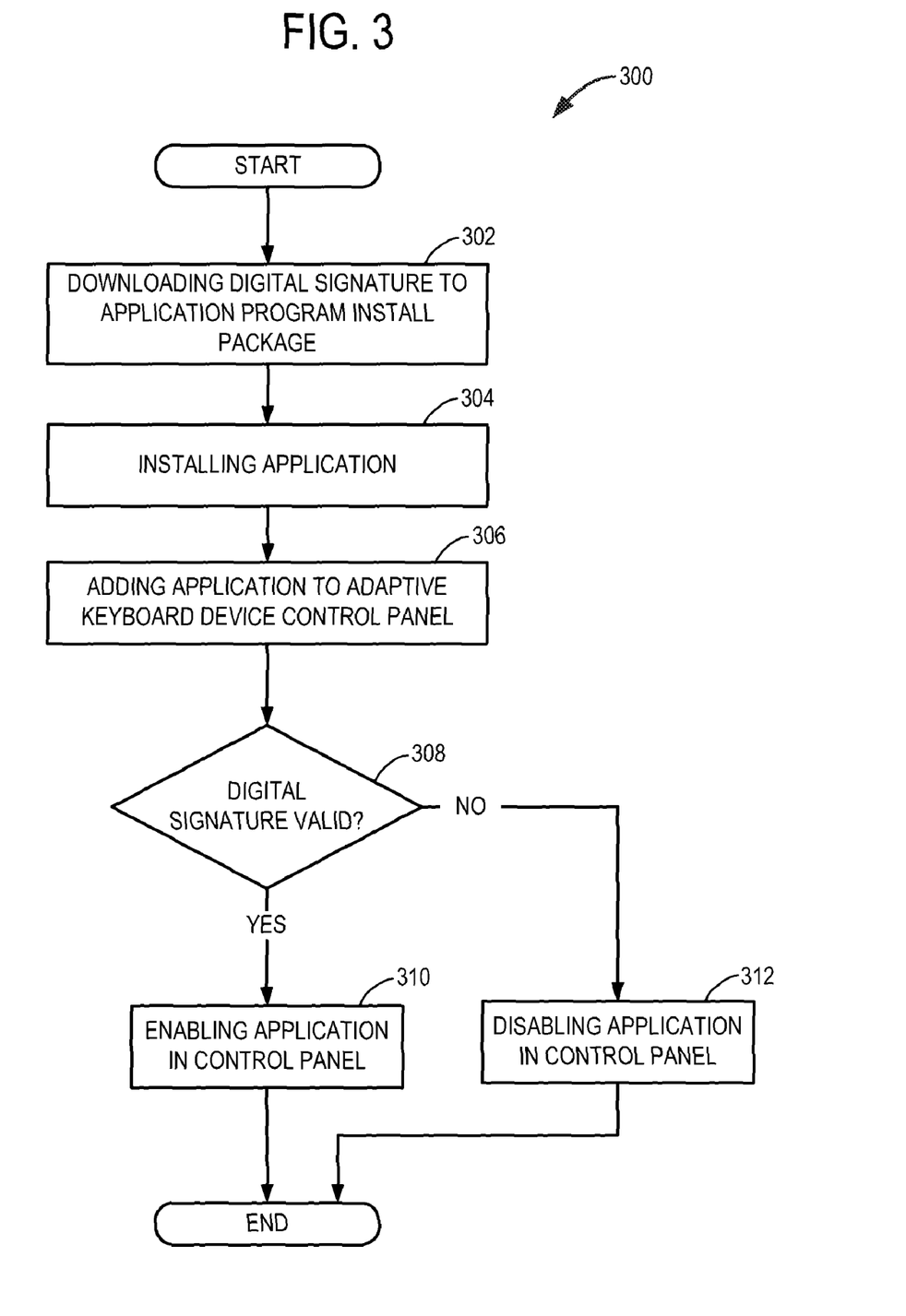
FIG. 3 is a flowchart illustrating an embodiment of a method for determining enablement of an application program in a control panel of an adaptive input device based on a digital signature check.
Figure 4:
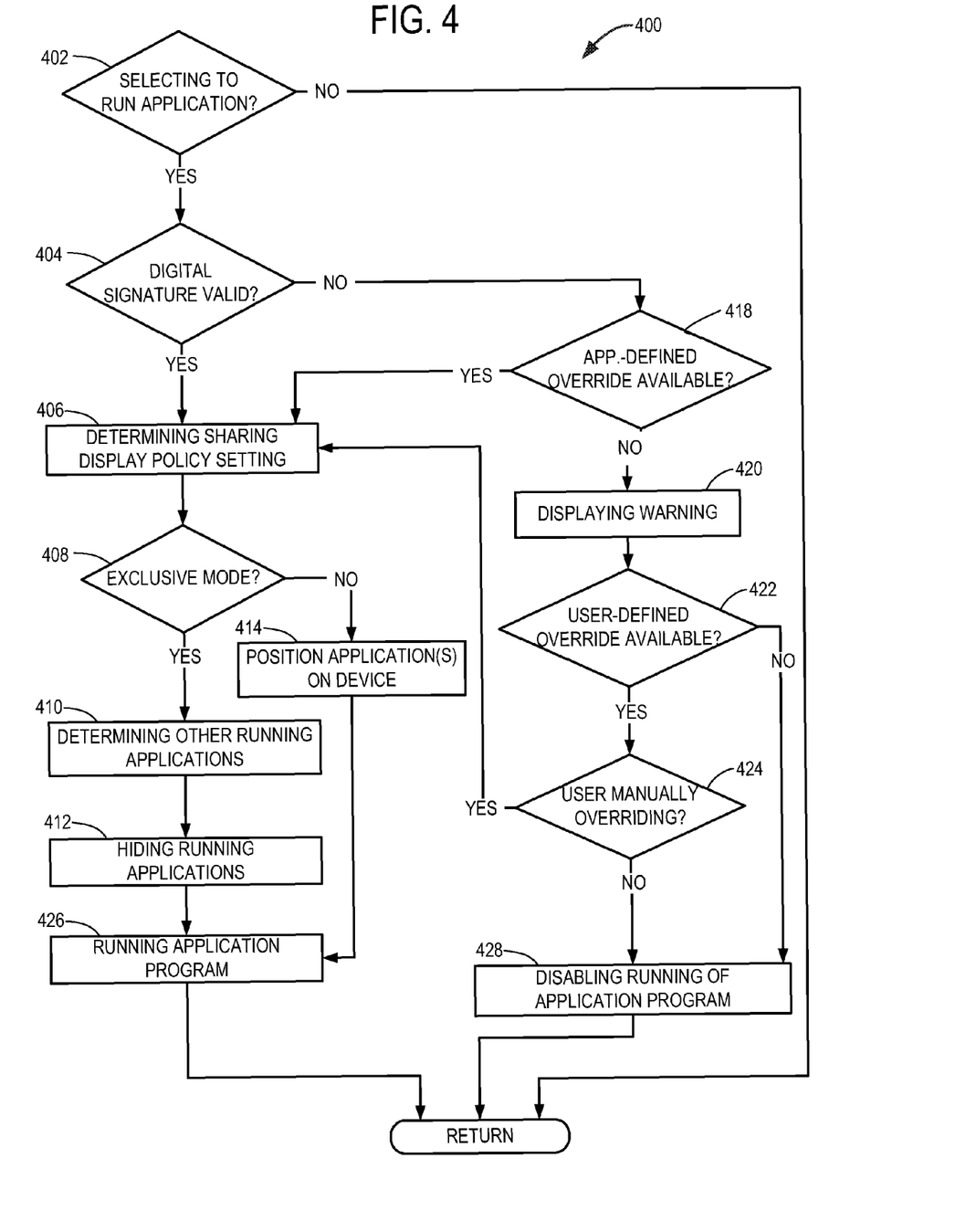
FIG. 4 is a flowchart illustrating an embodiment of a method for determining to run an application program based on availability of application program-defined and user-defined digital signature overrides.

Step 214 may include determining whether or not to enable an application program in a control panel upon installation, as is illustrated by the flowchart of FIG. 3. Step 214 of method 200 may also, or alternatively, include determining whether to run the application program, and may thus allow an application program to access an adaptive input device for subsequent interoperation based on an application of a digital signature policy, as is illustrated by the flowchart of FIG. 4. As will be appreciated upon study of FIG. 4, the availability of a user-defined override specifies that a user is provided the option to override a disablement of the application program, and the application program-defined override specifies that an application program is provided the option to override a disablement of the application program.

Referring now to FIG. 3, the method 300 includes downloading a digital signature to an application program's installation package at 302. At 304, the method includes installing an application program on a computing device, and at 306, adding the application program to the adaptive input device control panel. At 308, it is determined if a digital signature is valid. This may include determining if the application program has a digital signature and if the digital signature is up-to-date. If the answer is yes at 308, the method 300 includes enabling the application program in the control panel at 310. If the answer is no at 308, the method includes disabling the application program in the control panel at 312.

Referring now to FIG. 4, the method 400 includes determining if a user is selecting to run an application program at 402. If the answer is yes, the method 400 includes determining if a digital signature is valid and/or up-to-date at 404. If the answer is yes at 404, the method includes determining the display sharing policy setting of the application program at 406. If it is determined that the display sharing policy setting is the exclusive display mode at 408, the method includes determining other application programs that are running at 410, and hiding, minimizing, shutting down, and/or exiting the identified running application programs at 412, and running the nominal application program at 416.

If the display sharing policy setting is not the exclusive display mode at 408 (e.g., it is the shared display mode), the method 400 includes positioning the nominal application program on the adaptive input device and/or rearranging other running application program(s) on the adaptive input device at 414, and running the nominal application program at 426.

At 404, if the digital signature is determined to be not valid at 404, the method 400 includes determining at 418 if the application program-defined override is available to override an application program disablement. If the answer is yes at 418, the application program may override the digital signature check and the method 400 proceeds to 406 and the application program can run. If the answer is no at 418, the method 400 includes displaying, at 420, a warning on a display associated with the computing device on which the user is attempting to run the application program. At 422, it is determined if the user-defined override is available to allow a user to manually override a disablement of an application program. If the answer is yes at 422, the method determines if the user is manually selecting an override at 424. If the answer is yes at 424, the method proceeds to 406, and the application can be run. If the answer is no at 422 or 424, the method proceeds to 428 where there is a disabling of the running of the application program.

Methods for controlling access of application programs to the application programming interface as described herein may be executable on a computing device configured to execute any or all of the steps of the methods.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, declarative markup languages, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing system for controlling access of a plurality of application programs to a composite display of an adaptive input device, the computing system comprising:
 an application programming interface executable on a computing device, of the computing system, for controlling access of a plurality of application programs to a composite display of an adaptive input device, of the computing system, formed by a plurality of display regions, the application programming interface being configured to:
  receive a display request from one of the application programs to display formatted output on the composite display;
  apply at least a display sharing policy based on application-specific policy settings received from the application program for defining an application specific area including at least one of the display regions, the application-specific policy settings including a shared display mode and an exclusive display mode for the application program;
  generate formatted output based on the application-specific policy settings; and
  send the formatted output to the application-specific area for display.

2. The computing system of claim 1, wherein the shared display mode is configured for the application program to interoperate with an application-specific area including a subset of an assignable region of the composite display, and wherein the exclusive display mode is configured for the application program to interoperate with an application-specific area including substantially all of the assignable region of the composite display, the application-specific area including at least one touch-sensitive display region, and said interoperation including receiving touch input via the touch-sensitive display region.

3. The computing system of claim 1, wherein the shared display mode is configured for the application program to interoperate with an application-specific area including a subset of an assignable region of the composite display, and wherein the exclusive display mode is configured for the application program to interoperate with an application-specific area including substantially all of the assignable region of the composite display, the application-specific area including at least one display region formed on at least one of a plurality of spatially fragmented keys that are mechanically depressible, and said interoperating including receiving user input via actuation of a key having a display region on its surface.

4. The computing system of claim 1, wherein the application programming interface includes a policy engine, the policy engine being configured to apply a plurality of policies based on application-specific policy settings received from the application program.

5. The computing system of claim 1, wherein the application programming interface is further configured to apply a focus-based foreground-background policy based on application-specific foreground-background policy settings received from the application program to thereby define a foreground display mode or a background display mode for the formatted output of the application program.

6. The computing system of claim 1, wherein the application programming interface is further configured to apply an adaptive support level policy based on application-specific adaptive support level policy settings received from the application program to thereby specify a display priority level for the formatted output of the application program.

7. The computing system of claim 1, wherein the application programming interface is further configured to apply a digital signature policy based on digital signature policy settings received from the application programs, the digital signature policy settings thereby specifying an availability of a user-defined override to override a disablement of the application program and an availability of an application program-defined override for an application program to override a disablement of the application program.

8. The computing system of claim 1, wherein the application programming interface is further configured to apply a feedback policy based on feedback policy settings received from the application program to thereby specify an availability of an operation recommendation message from the application program and/or from an adaptive device developer and/or to specify an availability of user experience rankings from a community ranking engine for the formatted output.

9. The computing system of claim 1, wherein positions of application-specific areas of the composite display are customizable by a user to form a customized composite display layout.

10. The computing system of claim 1, wherein the application programming interface is configured to control access of the plurality of application programs to an adaptive input device desktop displayed on the composite display of the adaptive input device, the adaptive input device desktop being independent of an active desktop of the computing system.

11. A method for controlling access of a plurality of application programs to a composite display of an adaptive input device, the method comprising:
 receiving a display request from one of the application programs at an application programming interface to display formatted output on the composite display, the composite display having a plurality of display regions;
 applying at least a display sharing policy based on application-specific policy settings received from the application program to determine an application-specific area including at least one display region, the application-specific policy settings including a shared display mode and an exclusive display mode for the application program;
 generating formatted output based on the application-specific policy settings; and
 sending the formatted output to the application-specific area for display.

12. The method of claim 11, wherein the shared display mode is configured for the application program to interoperate with an application-specific area including a subset of an assignable region of the composite display, and wherein the exclusive display mode is configured for the application program to interoperate with an application-specific area including substantially all of the assignable region of the composite display, the application-specific area including at least one touch-sensitive display region, and said interoperation including receiving touch input via the touch-sensitive display region.

13. The method of claim 11, wherein the shared display mode is configured for the application program to interoperate with an application-specific area including a subset of an assignable region of the composite display, and wherein the exclusive display mode is configured for the application program to interoperate with an application-specific area including substantially all of the assignable region of the composite display, the application-specific area including at least one display region formed on at least one of a plurality of spatially fragmented keys that are mechanically depressible, and said interoperation including receiving user input via actuation of a key having a display region on its surface.

14. The method of claim 11, further comprising applying a focus-based foreground-background policy based on foreground-background policy settings received from the application program to thereby specify a foreground display mode or a background display mode for the formatted output of the application program.

15. The method of claim 11, further comprising applying an adaptive support level policy based on adaptive support level policy settings received from the application program to thereby specify a display priority level for the formatted output of the application program.

16. The method of claim 11, further comprising applying a digital signature policy based on digital signature policy settings received from the application program, the digital signature policy settings thereby specifying an availability of a user-defined override to override a disablement of the application program and an availability of an application program-defined override to override a disablement of the application program.

17. The method of claim 11, further comprising applying a feedback policy based on feedback policy settings received from the application program to thereby specify availability of an operation recommendation message from the application program and/or from an adaptive device developer, and/or to specify availability of user experience rankings from a community ranking engine for the formatted output.

18. The method of claim 11, wherein the application-specific area includes one or more sub-regions, and wherein positioning of application-specific areas and/or sub-regions of application-specific areas of the composite display are customizable to form a customized composite display layout.

19. A computing system for controlling access of a plurality of application programs to a composite display of an adaptive keyboard device, of the computing system, the system comprising:
an application programming interface executable on a computing device, of the computing system, configured to:
receive a display request from one of the application programs to display formatted output on the composite display, the composite display having a plurality of touch-sensitive display regions formed on a surface of each of a plurality of keys that are spatially fragmented and mechanically depressible;
apply at least a display sharing policy based on application-specific policy settings received from the application program to determine an application specific area including at least one of the keys;
generate formatted output, based on the application-specific policy settings;
send the formatted output to the application-specific area for display, wherein the application-specific policy settings include a shared display mode and an exclusive display mode for the application program; and
receive user input from the adaptive input device, of the computing system, via actuation of a mechanically depressible key and/or via touch input over a touch-sensitive display region.

* * * * *